Sept. 2, 1952 G. R. DUNCAN Re. 23,543

MILKING SYSTEM AND APPARATUS THEREFOR

Original Filed April 25, 1949 3 Sheets-Sheet 1

INVENTOR.
George R. Duncan
BY
Mason & Mason
ATTORNEYS

MILKING SYSTEM AND APPARATUS THEREFOR

Original Filed April 25, 1949 3 Sheets-Sheet 2

INVENTOR,
George R. Duncan
BY
Mason & Mason
ATTORNEYS

MILKING SYSTEM AND APPARATUS THEREFOR

Original Filed April 25, 1949 3 Sheets-Sheet 3

INVENTOR,
George R. Duncan
BY
Mason & Mason
ATTORNEYS

Reissued Sept. 2, 1952

Re. 23,543

UNITED STATES PATENT OFFICE 23,543

MILKING SYSTEM AND APPARATUS THEREFOR

George R. Duncan, Washington, Mo.

Original No. 2,498,401, dated February 21, 1950, Serial No. 89,375, April 25, 1949. Application for reissue November 28, 1950, Serial No. 198,016

26 Claims. (Cl. 119—14.09)

Matter enclosed in heavy brackets [ ] appears in the original patent but forms no part of this reissue specification; matter printed in italics indicates the additions made by reissue.

This invention relates to apparatus for milking farm animals such as cows in an expeditious and highly sanitary manner.

An object of the invention is to provide an apparatus in which one or a plurality of cows may be simultaneously milked by mechanical milking apparatus.

A further object is to provide a refrigerator of improved construction and in which are located the milk cans in combination with a milking machine.

An additional object is to provide a milking system that includes a mechanical refrigerator having lead-ins or conduits for supplying milk to the cans located in the refrigerator, as well as suction conduits and headers of *special* [especial] construction whereby the cans may be caused to be filled with milk, one after the other, in an automatic and completely sanitary manner.

A further object is to provide a system of milking cows, and an apparatus therefor, that includes a refrigerator and its cans and headers whereby a plurality of cows may be progressively milked as the refrigerator is moved alongside the milking barn, the filling of one can causing the [cessation of the flow of] milk to *flow through the top portion of* that can, and *begin* [the] filling of the next can, and so on, until all of the cans are filled with milk, or all of the cows are milked, whichever occurs first.

Yet another object is to provide milk can headers of a construction which insures the automatic filling of one milk can after another in a completely automatic manner [, and the stopping of the flow of milk after all of the cans have been filled with milk].

An additional object of the invention is to provide in a milking system the provision of conduits leading directly from one or more sets of teat cups to the interior of milk cans located in the refrigerator, and the construction which includes the connection of said cans [and/or sets of teat cups] to a milking machine, together with sealing arrangements for the tops of the cans whereby milk coming directly from the cows is untouched by human hands and is led automatically into a plurality of cans located within a refrigerating compartment, in order that the cans may be progressively filled.

A further object is to provide in the system described in the next preceding paragraph means for preventing the flow of milk into the suction line of the milking machine, as well as means to prevent the overflowing of any one of the cans during the filling operation.

Other objects will be found hereinafter throughout the specification.

In the drawings:

*Figure 5 shows a fragmentary side elevation of a milk can and a closure therefor with parts broken away and parts shown in section;*

*Figure 6 is a side elevation of a set of teat cups in position on the cow, and showing further the suction line and milk line;*

*Figure 7 is an enlarged view of the tube and closure therefor of the suction line with one end shown in vertical section; and,*

Figure 1:
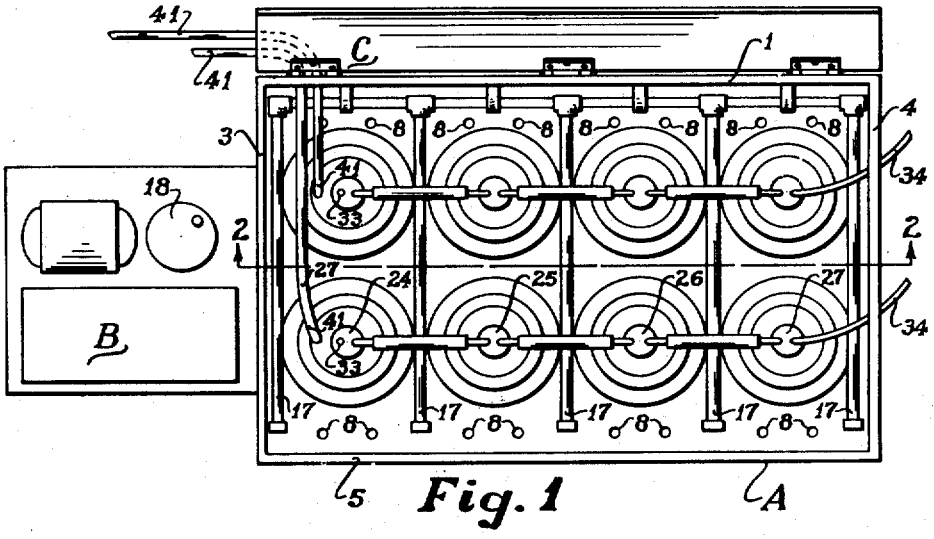
Figure 1 is a top plan view of a refrigerating container showing the power plant therefor and the milk and suction conduits, as well as the connection between the cans.
Figure 2:
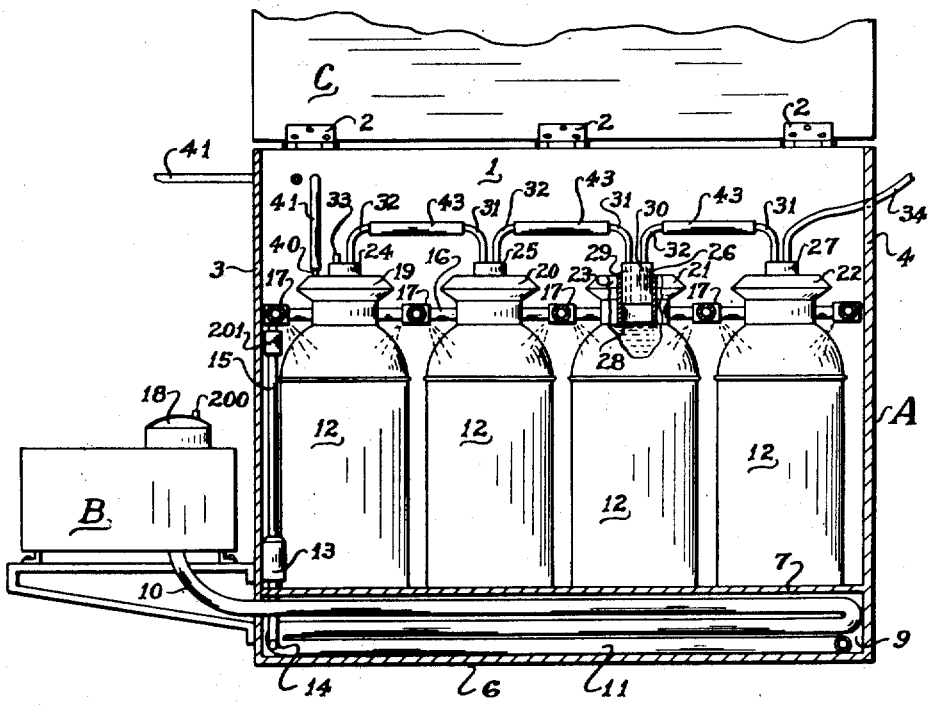
Figure 2 is a partial vertical section of the apparatus shown in Figure 1, *substantially on the line 2—2 of Figure 1*, with a power plant shown in full lines.

As shown in Figures 1 and 2, the apparatus comprises a refrigerator indicated at A and a refrigerating unit B which latter may be of the compression-expansion type, or it may be of the type which is operated by heat. The refrigerator may have a top C, the top being pivoted to the rear vertical wall 1 by hinges 2. The side walls are indicated at 3 and 4, the front wall at 5, and the base at 6.

There is a sub-base indicated at 7 which may be provided with holes 8 whereby water that finds its way to the sub-base 7 may go through the holes into the space 9 located between the base and sub-base. Refrigerant from the refrigerating unit passing through a pipe 10 to a coil 11 located between the base and sub-base and is returned in a closed circuit by a pipe, not shown, to the refrigerating unit B.

There is a controlled circulation of water over the outside portion of the cans 12. Such circulation is caused by the secondary circulation system which comprises a pump 13 having a pipe 14 which extends adjacent to the base 6 within the space 9 whereby water in said space is drawn into the pump and forced upwardly through the vertical pipe 15 to the header 16. As seen in these figures the header is provided with a plurality of horizontally extending branch pipes 17 which are adapted to extend between adjacent cans as seen in Figures 1 and 2. The branch pipes are each provided with a plurality of spaced perforations.

The temperature of the refrigerant in the coil 11 is maintained by a regulating means 18 so that the refrigerant passing through the coil may be at any desired temperature. The space 9 ordinarily filled with water and the regulating means is adjusted so that some of this water, particularly the water closely surrounding or adjacent to the coil, will become frozen. The other water not located so near the coil is taken through the inner pipe 14 to the pipe 13 and forced upwardly to the header 16 and out of the perforations of the pipe 17 as shown in Figure 2 where it is sprayed on to the sides of the milk cans. This water, as it engages the sides of the milk cans, is usually maintained by adjustment of the regulating means 18 at about 33° F. so as to maintain the milk in the milk cans at about 53° F. *This regulating means 18 may be a thermostat for controlling the temperature of the refrigerating fluid passing through pipe 10 and within coil 11. This regulating means and the control 201, described hereinafter, may be so adjusted as to maintain the temperature of the water being sprayed against the cans, to thereby cool the temperature of the milk down to the proper degree of temperature during the filling of the cans, and during their storage in the container A. It will be necessary to adjust the temperature after the cans have been completely filled in the event it is desired to store the milk so that the water then being sprayed against the cans will be at a higher temperature than when the cans are being filled with milk.* This temperature is maintained fairly steady during the filling of the milk cans. After the milk cans become full they are removed from the refrigerator A and other empty cans are moved in to take their place.

As shown in Figure 1, the refrigerator is of a size to accommodate eight milk cans, but it will be understood that any number, preferably more than 3, may be accommodated in the refrigerator, and the size of the container may be such as to accommodate as many as 4, 6, 8, 10, 12, or 14 milk cans, according to the size of the refrigerator. The milk cans 12 are provided with special covers or headers indicated at 19, 20, 21 and 22. These covers of the rear row of milk cans are exactly similar to the covers of the front row as will be seen by reference to Figure 1. The left hand cover 19, *as shown in Figure 2,* is provided with a nipple 40 to which the suction conduit 41 is attached. The suction or vacuum conduit may be connected to any suitable source of minus pressure and may form part of a milking machine. Covers 21 and 22 are exactly similar to each other and are not provided with the nipple 40. Substantially centrally located in each cover 19, 20, 21 and 22, is an aperture 23 which is adapted for the reception of *sleeve 28 of* plugs 24, 25, 26 and 27. Attached to each plug and forming part thereof is an extension or a sleeve 28. This sleeve closely fits the periphery of the aperture in the can top and the plug, which is of resilient material such as soft rubber, closely fits the sleeve, but only extends part way down into the sleeve, as indicated in the broken away showing of the third can from the left in Figure 2. [The sleeve may be dispensed with and the plug be formed with an integral skirt (not shown), or the extension may be integral with the can top or cover. In other words, referring to Figure 4, the sleeve 86 may be dispensed with, but the extension 85 may be continued down to any point so as to take the place of the sleeve 86.]

Each plug is provided with a plurality of passages 29 and 30 for the reception of pipes 31 and 32. The passageway 29 of each can shown at the left of the drawing is closed by a rubber or other plastic plug 33, and the can of each row located farthest to the right is provided with a milk conduit 34. Each of these *conduits* [pipes], as indicated in Figure 1, leads directly to a set of teat cups, as indicated *by numeral 120* in Figure 6 herein. The suction conduits 41 extend through the back of the refrigerator and, as stated above, are connected to the suction line of a milking machine.

When suction is applied to the lines 41, milk from a cow enters through plug 27 of the rightmost can. After this can becomes filled [to the neck portion thereof or] up to the lower end of the *plug 26,* [sleeve 28, no more milk flows into the can, but] the milk then flows *from pipe 32 via sleeve 28 through* [upwardly through] pipe *31* [32], connector 43 and down pipe *32* [31] through plug 26 until the second can becomes full to about the point indicated in Figure 2, whereupon the flow of milk reverses its direction and flows upward against gravity through pipe *31* [32] through connector 43 and downwardly through pipe *32* [31] into the third can. After this can becomes filled to the extent shown by the second can, in other words, to the lower end of the *plug 26* [sleeve 28], the milk does not flow downwardly into the can much beyond the base of the plug, but reverses itself and flows upwardly through pipe *31* [32], connector 43 and downwardly through pipe *31 until the next can is filled.* [32 until the leftmost can is nearly full of milk. Each suction pipe 41 may be provided with the valve means, not shown, for breaking the partial vacuum in the suction lines when the last can has become filled, and a sight glass positioned in the pipe 41, not shown, may be used so that it can be observed when any milk is flowing through either pipe 41 in order that the suction may be discontinued at this time.]

Figure 3:
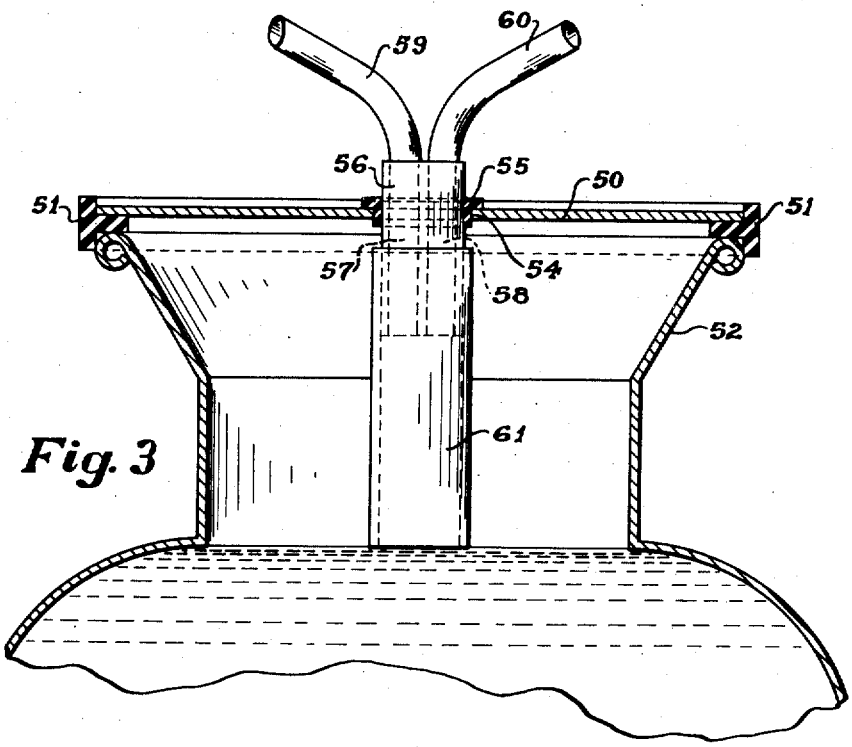
Figure 3 is *an enlarged* [a] vertical sectional view of *the top of a milk can and showing* one emobdiment of the invention as applied to the top of a milk can.

The structure shown in Figure 3 is similar to *the covers or headers* [that] shown in Figures 1 and 2 and consists of a cover or header 50 provided with a rubber or other sealing gasket 51, preferably T-shaped in cross section as indicated. The gasket is adapted to seal the cover on the upper periphery of an ordinary milk can 52.

Preferably, the center portion of the cover is provided with an aperture 54 for the reception of a rubber or other flexible gasket 55 which seats the plug 56. The plug is preferably also of flexible material such as soft rubber and it is provided with two longitudinally extending channels 57 and 58 which extend out of the lower end thereof as indicated in dotted lines. The upper ends of the channels are provided with pipes 59 and 60 which form a gastight fit with the channels 57 and 58, and these pipes correspond to pipes 31 and 32 of Figures 1 and 2. Frictionally engaging the lower end of the plug as shown is a sleeve 61. This sleeve forms a tight fit with the lower end of the plug and extends downwardly adjacent the base of the neck of the can as seen in Figure 3. The operation of this structure is similar to the structure attached to the tops of the cans shown in Figures 1 and 2. It is intended, of course, to use a plurality of structures such as shown in Figure 3 in the same manner and connected in the same way as the cans are connected to each other as seen in Figures 1 and 2. In other words, the can at one end of the line will be connected to the suction pipe of a milking machine and the can at the other end will be connected to a milking apparatus such as a set of teat cups whereby milk may flow directly from the cow to the can.

Figure 4:
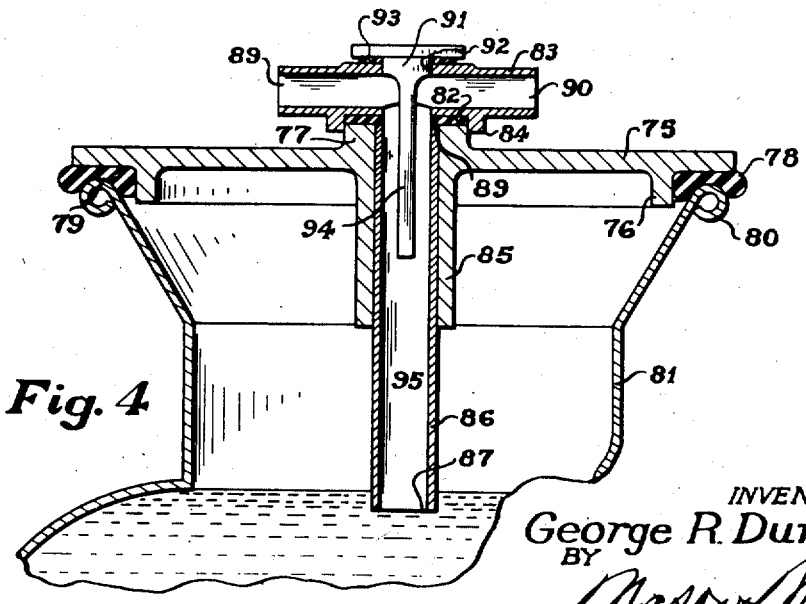
Figure 4 is *an enlarged* [a] vertical sectional view of *the top of a milk can and showing* a second embodiment of the invention as applied to the top of a milk can.

The modification shown in Figure 4 has a cover or header 75 having a lower circular flange 76 and an upwardly extending centrally located circular flange 77. The periphery of the cover is adapted to engage a circular sealing ring 78 which is provided with a groove 79 that seats on the bead 80 of the milk can 81. The upwardly extending flange 77 has seated on it a washer 82 which seats a header 83 having a lower circular flange 84 which extends over the washer and partially embraces the upwardly extending flange 77.

There is a centrally downwardly extending neck portion 85 which extends preferably centrally from the top 75. This neck serves to hold in friction-tight engagement a sleeve 86 whose lower end 87 may extend slightly below the neck portions *81* [88] of the can and its upper end 89 may be in abutting engagement with the washer 82. The pipe header 83 is provided with oppositely extending passages 89 and 90. These passages are sealed off from each other by a T 91 which seats in an aperture 92 of the header on a washer 93 and has an extension 94 which extends entirely across passageways 89 and 90, and diametrically across the inner cylindrical surface 95 of the sleeve. The T 91 and especially its extension 94 is constructed of flexible rubber or a synthetic rubber composition and it is frictionally engaged at the inner cylindrical surface 95 of the sleeve 86 and forms a tight fit thereby dividing the upper portion of the sleeve into two passageways. It will be noted that the extension 94 terminates considerably short of the lower end of the sleeve 86.

A special advantage in using the construction shown in Figure 4 is that the parts may be quickly detached from each other, that is, the T 91 may be removed from the sleeve 86 and from the header 83. The header 83 may also be removed from the cover 75 and the several washers may be also removed and replaced where necessary. All of the parts can be completely sanitized by washing when the occasion demands.

Figure 7:
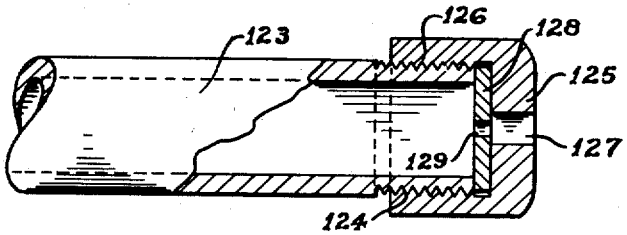
[Figure 7 is an end elevation of the closure shown in Figure 6.]
Figure 8:
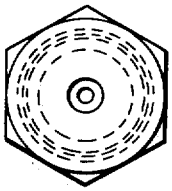
*Figure 8 is an end elevation of the closure shown in Figure 7.*
Figure 6:
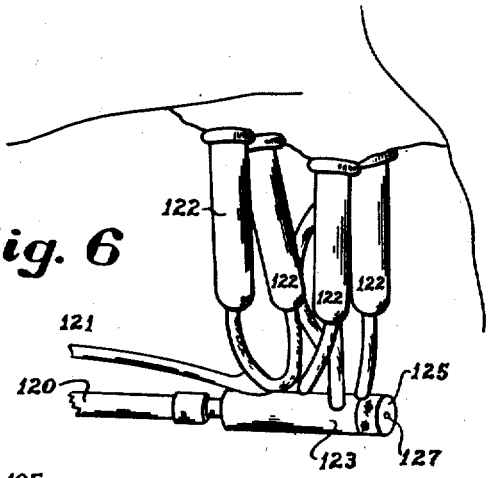
[Figure 6 is a view of the tube and closure therefor of the suction line with one end broken away and the opposite end shown in section, and]
Figure 5:
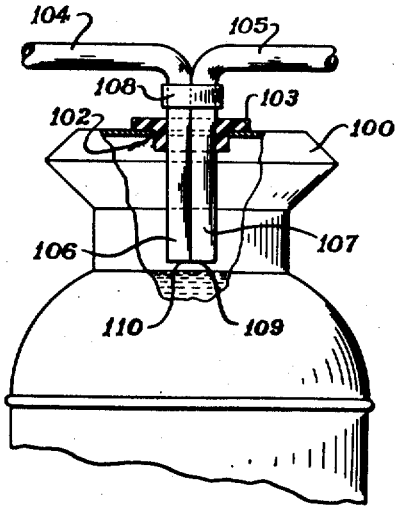
[Figure 5 is a side elevation of a set of teat cups in position on the cow, and showing further the suction line and milk line.]

The suction line 41 and milk line 34 such as shown in Figures 1 and 2, may be connected directly to the suction line *121* [120] and milk line *120* [121] of the structure shown in Figure 6. In this figure the teat cups are indicated at 122 and they are connected directly to the milk line *120* [121] and to the suction line *121* [120]. The [suction] *milk* line is provided with an extension 123, details of which are shown in Figures 7 and 8. One end of the extension is connected to the [suction] *milk* line as shown and the other end is provided with threads 124 for the attachment of a plug 125 whose interior is provided with threads 126 whereby the plug may be threaded on the end of the extension. The plug is provided with an aperture 127 and when the plug is screwed on to the end of the extension, there is a washer 128 which is clampingly engaged in position so that its aperture 129 will be in alignment with the aperture 127 of the plug.

This arrangement permits the entry of air into the *milk* [suction] line and tends to greatly accelerate the speed of the milk as it flows into a can and from one can to another. It will be appreciated that the amount of air which is permitted to enter the extension 123 and through the [suction] *milk* line, depends upon the size of the aperture 129 of the washer. It is intended that the aperture 127 of the plug be of the same size or preferably larger than the size of the aperture 129 and it is also intended to use washers having different sized apertures 129 to thereby adjust or regulate the amount of air which is permitted to enter the *milk* [suction] line, and to thereby control the speed of the milk from one can to the other during the filling operation.

The present invention is a continuation-in-part of my application Serial No. 676,368 filed June 13, 1946, now Patent Number 2,470,979, granted May 24, 1949.

While the present system *including covers or headers* is particularly adapted for use in a mechanical refrigerator, it is to be distinctly understood that the system does not, in its broadest definition, include a refrigerator, but includes a plurality of cans and the connections from the suction and milk lines to said cans, as well as the connections from one to another of said cans.

The gasket 51, as seen in Figure 3, is of T-shape in cross-section. However, after suction has been applied to the interior of the can, said gasket may be deformed, because of its rubber-like material [, to the shape shown at 78 in Figure 4].

The refrigerator B is provided with control means 200 and pipe [41] *15* is provided with a control 201. The purpose of these controls is to regulate the temperature within the cabinet and the temperature of the milk, so that it is maintained at a given temperature. The temperature above the *sub-base* [can stand] 7 is held at one temperature and the temperature below the *sub-base* [can stand] is held at another temperature. These controls are thermostatic controls.

[It will be understood that the sleeve 61, shown in Figure 3, and the sleeve 86, shown in Figure 4, may be omitted, for, while these sleeves have been found to be of advantage, they are not required under all conditions, but are preferably used when a large number of cans are connected together.]

"Conduit means" in the claims includes the entire system of conduits such as the conduit or conduits leading from the source of minus pressure to one of the cans and may also include the vacuum conduit to the teat cups, the milk conduit or conduits from the source of milk, such as the teat cups, and leading to one or more of the cans, the conduits leading into the several cans and provided with openings located closely adjacent to each other, and the conduits connecting the interiors of the cans to each other. For instance, in Figure 2, "conduit means" in the claims includes (from left to right in this figure), parts 41, 40, 24, 32, 43, 31, 25, 32, 43, 31, 30, 32, 43, 31, 27 and 34. Parts 120 and 121 of Figure 6 may also be included by this term. In other figures corresponding parts are included.

*It will be understood that the mechanical refrigerating and cooling means comprises the flow structure, the same being an illustration of one of the forms which this invention may take, namely, the structure shown in Figure 2 including the mechanical refrigerator A and its control means 18 and 201, the coil 11 and the inner pipe 14, pump 13, header 16, and the perforated pipe 17. This structure acts as the dissipating means, when the refrigerant is forced through coil 11, and the cooling water in the sump 9 is forced upwardly and outwardly through the spray pipe 17 which sprays water against the sides of the can as the can sides heat up and as the can gradually fills with milk during the operation, and to keep the cans cool following the milking operation.*

Changes in shape, size, materials and rearrangements of parts may be resorted to in actual practice and the present specification and drawings are to be considered as illustrative rather than restrictive.

I claim:

1. In a system for simultaneously milking a domestic farm animal and for cooling and storing the milk in cans, without handling, as it comes from the animal comprising a container *having a cooling chamber provided with supporting means for supporting a plurality of cans in said chamber in upright position*, a plurality of milk cans having covers, [a milking machine having] a milk conduit, a vacuum conduit; conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, said opening located below said pair of openings being of larger size than either of the openings of said pair of openings, said conduit means extending into said container, and controllable mechanical refrigerating and *dissipating* [cooling] means operatively connected to said container *including means for circulating cooling water within said cooling chamber* for continuously cooling the milk in said cans and removing body heat therefrom following the milking operation and for maintaining a substantially predetermined temperature of the milk in said cans within said container.

2. In a system for simultaneously milking a domestic farm animal and for cooling and storing the milk in cans, without handling, as it comes from the animal comprising a container *having a cooling chamber provided with supporting means for supporting a plurality of cans in said chamber in upright position*, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, said opening located below said pair of openings being of larger size than either of the openings of said pair of openings, said conduit means extending into said container, and controllable mechanical refrigerating and *dissipating* [cooling] means operatively connected to said container *including means for circulating cooling water within said cooling chamber* for continuously spraying water over the sides of the cans and cooling the milk in said cans and removing body heat therefrom following the milking operation and for maintaining a substantially predetermined temperature of the milk in said cans within said container.

3. In a system for simultaneously milking a domestic farm animal and for cooling and storing the milk in cans, without handling, as it comes from the animal comprising a container *having a cooling chamber provided with supporting means for supporting a plurality of cans in said chamber in upright position*, a plurality of milk cans having covers, [a milking machine having] a milk conduit, a vacuum conduit, conduit means including said conduits first named for connecting said interiors of said milk can through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, said opening located below said pair of openings being of larger size than either of the openings of said pair of openings, said conduit means extending into said container, and controllable mechanical refrigerating and *dissipating* [cooling] means operatively connected to said container *including means for circulating cooling water within said cooling chamber* for continuously cooling the milk in said cans and removing body heat therefrom following the milking operation and for maintaining a substantially predetermined temperature of the milk in said cans within said container, said controllable mechanical refrigerating and cooling means including a refrigerating unit mounted on said container and having a coil extending into the interior of said container.

4. In a system for simultaneously milking a domestic animal and for cooling and storing the milk in cans, without handling, as it comes from the animal comprising a container *having a cooling chamber provided with supporting means for supporting a plurality of cans in said chamber in upright position*, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, said opening located below said pair of openings being of larger size than either of the openings of said pair of openings, said conduit means extending into said container, and controllable mechanical refrigerating and *dissipating* [cooling] means operatively connected to said container *including means for circulating cooling water within said cooling chamber* for continuously cooling the milk in said cans and removing body heat therefrom following the milking operation and for maintaining a substantially predetermined temperature of the milk in said cans within said container, said mechanical refrigerating and cooling means further including a spray system located in said container having spray pipes for spraying water on said cans, a sub-base for supporting said cans thereon and a space beneath said sub-base forming a water reservoir for containing water sprayed on said cans by said spray system.

5. In a system for simultaneously milking a domestic farm animal and for cooling and storing the milk in cans, without handling, as it comes from the animal comprising a container *having a cooling chamber provided with supporting means for supporting a plurality of cans in said chamber in upright position*, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, the effective cross sectional area of the opening of said means last named being greater than the cross sectional area of either of said pair of openings, said conduit means extending into said container, and controllable mechanical refrigerating and *dissipating* [cooling] means operatively connected to said container *including means for circulating cooling water within said cooling chamber* for continuously cooling the milk in said cans and removing body heat therefrom following the milking operation and for maintaining a substantially predetermined temperature of the milk in said cans within said container.

6. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, said opening located below said pair of openings being of larger size than either of the openings of said pair of openings.

7. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber extending below said openings, said chamber having at least one opening located below said pair of openings, the effective cross sectional area of the opening of said means last named being greater than the cross sectional area of either of said pair of openings.

8. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means defining a restricted chamber enclosing that portion of said conduit means extending into the interior of each can, said restricted chamber extending below said openings, said last named means having at least one opening located below said pair of openings, said opening located below said pair of openings being of larger size than either of the openings of said pair of openings.

9. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and having openings located closely adjacent to each other, and means comprising a sleeve defining a restricted chamber enclosing that portion of said conduit means extending into the interior of each can, said restricted chamber extending below said openings, said last named means having at least one opening located below said pair of openings, said opening located below said pair of openings being of larger size than either of the openings of said pair of openings.

10. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said milk cans in series to each other, said conduit means extending into the interior of each can and including a pipe header having a sleeve extending downwardly into the interior of each can and means defining openings in said sleeve located closely adjacent to each other, said sleeve extending below said openings, said sleeve having an opening located below said pair of openings, said opening located below said pair of openings being of larger size than either of the openings of said pair of openings.

11. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means extending into the interior of each can and including a pipe header having a sleeve extending downwardly into the interior of each can and means defining openings in said sleeve located closely adjacent to each other, said sleeve extending below said openings, said sleeve having an opening located below said pair of openings, said opening located below said pair of openings being of larger size than either of the openings of said pair of openings, said means defining said pair of openings comprising a T having horizontal portions which are supported by said header, and the vertical portion of said T forming a partition within said sleeve.

12. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means including a pair of pipes extending into the interior of each can and having openings located closely adjacent to each other, and means defining a restricted chamber extending below said openings, said chamber having at least one opening located below said pair of openings, said opening located below said pair of openings, being of larger size than either of the openings of said pair of openings.

13. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means including a pair of pipes extending into the interior of each can and having openings closely adjacent to each other, and a sleeve defining a restricted chamber extending below said openings and closely surrounding said pair of pipes, said sleeve having at least one opening located below said pipe openings, said sleeve opening being of larger diameter than either of the diameters of the openings of said pair of openings.

14. In a system for simultaneously milking a domestic farm animal and for filling a plurality of milk cans, in combination, a plurality of milk cans having covers, [a milking machine having] a milk conduit, a vacuum conduit, conduit means including said conduits first named for connecting said interiors of said milk cans through the covers thereof and connecting the interiors of said cans in series to each other, said conduit means including a header consisting of a vertical sleeve and inlet and outlet passageway means connected with said vertical sleeve, said vertical sleeve extending into the interior of a can and an extension within said vertical sleeve which extends completely across the same for a portion of its vertical length to provide a pair of openings, said sleeve having [a] *an* opening located below said pair of openings, said sleeve opening being of larger diameter than either of the diameters of said pair of openings.

*15. A system for simultaneously milking a domestic farm animal and storing the milk, without handling, in cans as it comes from the animal comprising a refrigerator having a cooling chamber provided with supporting means for holding a plurality of milk cans in an upright position, a first conduit means adapted for connection to a source of minus pressure, a second conduit means having teat cups for connection to the teats of the animal's udder, a plurality of covers for permitting a minus pressure during the milking operation, means connecting said conduit means to said covers and said covers to each other whereby minus pressure may be applied to said teat cups through said first conduit means, said covers and said second conduit means, and controllable mechanical refrigerating and dissipating means operatively connected to said refrigerator including means for circulating cooling water within said cooling chamber for continuously cooling the exterior surfaces of cans in said refrigerator and removing body heat from the milk in said cans during the milking operation and maintaining a predetermined temperature in said refrigerator.*

*16. A system for simultaneously milking a domestic farm animal and storing the milk, without handing, in cans as it comes from the animal comprising a refrigerator having a cooling chamber provided with supporting means for holding a plurality of milk cans in an upright position, a first conduit means adapted for connection to a source of minus pressure, a second conduit means having teat cups for connection to the teats of the animal's udder, a plurality of covers for permitting a minus pressure during the milking operation, means connecting said conduit means to said covers and said covers to each other whereby minus pressure may be applied to said teat cups through said first conduit means, said covers and said second conduit means, and controllable mechanical refrigerating and dissipating means operatively connected to said refrigerator for continuously cooling the exterior surfaces of cans in said refrigerator and removing body heat from the milk in said cans during the milking operation and maintaining a predetermined temperature in said refrigerator, said refrigerating and dissipating means including means for causing a substantially continuous flow of a cooling fluid medium within said refrigerator.*

*17. A system for simultaneously milking a domestic farm animal and storing the milk, without handling, in cans as it comes from the animal comprising a refrigerator having a cooling chamber provided with supporting means for holding a pluraility of milk cans in an upright position, a first conduit means adapted for connection to a source of minus pressure, a second conduit means having teat cups for connection to the teats of the animal's udder, a plurality of covers for permitting a minus pressure during the milking operation, means connecting said conduit means to said covers and said covers to each other whereby minus pressure may be applied to said teat cups through said first conduit means, said covers and said second conduit means, and controllable mechanical refrigerating and dissipating means operatively connected to said refrigerator for continuously cooling the milk and removing body heat from the milk during the milking operation* and maintaining a predetermined temperature in said refrigerator, said refrigerating and dissipating means including means for causing a flow of a cooling fluid medium within said refrigerator.

18. A system for simultaneously milking a domestic farm animal and storing the milk, without handling, in cans as it comes from the animal comprising a refrigerator having a cooling chamber provided with supporting means for holding a plurality of milk cans in an upright position, a first conduit means adapted for connection to a source of minus pressure, a second conduit means having teat cups for connection to the teats of the animal's udder, a plurality of covers for permitting a minus pressure during the milking operation, means connecting said conduit means to said covers and said covers to each other whereby minus pressure may be applied to said teat cups through said first conduit means, said covers and said second conduit means, and controllable mechanical refrigerating and dissipating means operatively connected to said refrigerator including means for circulating cooling water within said cooling chamber for continuously cooling the interior of said refrigerator and removing body heat from the milk during the milking operation and maintaining a predetermined temperature in said refrigerator, said conduit means further including conduits having open ends extending into said covers.

19. In a system for simultaneously milking a domestic farm animal and for cooling and storing the milk in cans without handling, as it comes from the animal, comprising a container having a cooling chamber provided with supporting means for supporting a plurality of cans in said chamber in upright position, a plurality of milk cans in said container, a plurality of closures for the milk cans in said container, a milk conduit, a vacuum conduit, conduit means including said conduits first named for connecting said interiors of milk cans when in said container, through the closure means thereof and connecting the interiors of said cans in series to each other, said conduit means extending into the interior of each of the cans when in said container and having openings located below the closure means of each can and for permitting a minus presure in the can during the milking operation, whereby minus pressure may be applied to said teat cups through said conduit means and to the interior of said cans, and controllable mechanical refrigerating and dissipating means operatively connected to said container including means for circulating cooling water within said cooling chamber for continuously cooling the milk in said cans and removing body heat therefrom during the milking operation and maintaining a predetermined temperature in said container.

20. In a system for simultaneously milking a domestic farm animal and for cooling and storing the milk in cans without handling, as it comes from the animal, comprising a container having a cooling chamber provided with supporting means for supporting a plurality of cans in said chamber in upright position, a plurality of milk cans in said container, a plurality of closures for the milk cans in said container, a milk conduit, a vacuum conduit, conduit means including said conduits first named for connecting said interiors of milk cans when in said container, through the closure means thereof and connecting the interiors of said cans in series to each other, said conduit means extending into the interior of each of the cans when in said container and having openings located below the closure means of each can and for permitting a minus pressure in the can during the milking operation, whereby minus pressure may be applied to said teat cups through said conduit means and to the interior of said cans, and controllable mechanical refrigerating and dissipating means operatively connected to said container for continuously cooling the milk in said cans and removing body heat therefrom during the milking operation and maintaining a predetermined temperature in said container, said dissipating means including spray pipe means located in position for spraying a cooling fluid on said cans.

21. A system for simultaneously milking a domestic farm animal and for cooling and storing the milk in cans without handling, as it comes from the animal, comprising a container having a cooling chamber provided with supporting means for supporting a plurality of cans in said chamber in upright position, a plurality of milk cans in said container, a plurality of closures for the milk cans in said container, a milk conduit, a vacuum conduit, conduit means including said conduit first named for connecting the interiors of the milk cans when in said container through the closure means thereof and connecting the interiors of said cans in series to each other, said conduit means extending into the interior of each can and having openings beneath said closure means of each can, and controllable mechanical refrigerating and dissipating means operatively connected to said container for continuously cooling the milk in said cans and removing body heat therefrom during the milking operation and maintaining a predetermined temperature in said container, said refrigerating and dissipating means including means for causing a substantially continuous flow of a cooling fluid medium against the outside surfaces of said cans when in said container.

22. A system for simultaneously milking a domestic farm animal and for cooling and storing the milk in cans without handling, as it comes from the animal, comprising a container having a cooling chamber provided with supporting means for supporting a plurality of cans in said chamber in upright position, a plurality of milk cans in said container, a plurality of closures for the milk cans in said container, a milk conduit, a vacuum conduit, a conduit means including said conduit first named for connecting the interiors of the milks cans when in said container through the closure means thereof and connecting the interiors of said cans in series to each other, said conduit means extending into the interior of each can and having openings located beneath said closure means of each can, and controllable mechanical refrigerating and dissipating means operatively connected to said container for continuously cooling the milk in said cans and removing body heat therefrom during the milking operation and maintaining a predetermined temperature in said container, said refrigerating and dissipating means including means for causing a substantially continuous flow of a cooling fluid medium against the outside surfaces of said cans when in said container, said dissipating means including spray pipe means located in position for spraying a cooling fluid on said cans.

23. In a system for simultaneously milking a

*domestic farm animal and for cooling and storing the milk in cans without handling, as it comes from the animal, comprising a refrigerator having a cooling chamber provided with supporting means for supporting a plurality of cans in upright position and for cooling milk in cans located therein, a plurality of milk cans in said refrigerator, a plurality of closures for the milk cans in said refrigerator, a milk conduit, a vacuum conduit, conduit means including said conduits first named for connecting said interiors of milk cans when in said refrigerator, through the closure means thereof and connecting the interiors of said cans in series to each other, said conduit means extending into the interior of each of the cans when in said refrigerator and having openings located below the closure means of each can and for permitting a minus pressure in the can during the milking operation, whereby minus pressure may be applied to said teat cups through said conduit means and to the interior of said cans, and controllable mechanical refrigerator and dissipating means operatively connected to said refrigerator including means for circulating cooling water within said cooling chamber for continuously cooling the milk in said cans and removing body heat therefrom during the milking operation and maintaining a predetermined temperature in said refrigerator.*

*24. A system for simultaneously milking a domestic farm animal and for cooling and storing the milk in cans without handling, as it comes from the animal, comprising a refrigerator having a cooling chamber provided with supporting means for supporting a plurality of cans in upright position and for cooling milk in cans located therein, a plurality of milk cans in said refrigerator, a plurality of closures for the milk cans in said refrigerator, a milk conduit, a vacuum conduit, conduit means including said conduit first named for connecting the interiors of the milk cans when in said refrigerator through the closure means thereof and connecting the interiors of said cans in series to each other, said conduit means extending into the interior of each can and having openings located beneath said closure means of each can, and controllable mechanical refrigerating and dissipating means operatively connected to said refrigerator for continuously cooling the milk in said cans and removing body heat therefrom during the milking operation and maintaining a predetermined temperature in said refrigerator, said refrigerating and dissipating means including means for causing a substantially continuous flow of a cooling fluid medium against the outside surfaces of said cans when in said refrigerator.*

*25. A milk loading system for cooling and storing milk in a can directly as it comes from the animal during the milking operation, which comprises a refrigerator body, said body including a refrigerator compartment adapted to accommodate a plurality of milk cans in an upright position, a milking machine including a first conduit means adapted for connection to a source of vacuum and a second conduit means connected to a milking apparatus including teat cups for connection to the teats of the animal's udder, closure means adapted to hermetically seal the open end of such cans and for permitting a vacuum therein during the milking operation, each of said conduit means being in communication with the interior of such cans through said closure means, whereby vacuum may be applied to said milking apparatus through said first conduit means, such can interiors and said second conduit means, and means for operatively connecting refrigerating means to said compartment whereby milk is continuously cooled to remove body heat therefrom during the milking operation.*

*26. A system for simultaneously milking a domestic farm animal and storing the milk, without handling, in cans as it comes from the animal comprising a refrigerator having a cooling chamber provided with supporting means for holding a plurality of milk cans in an upright position, a first conduit means adapted for connection to a source of minus pressure, a second conduit means having teat cups for connection to the teats of the animal's udder, a plurality of covers for permitting a minus pressure during the milking operation, means connecting said conduit means to said covers and said covers to each other whereby minus pressure may be applied to said teat cups through said first conduit means, said covers and said second conduit means, and controllable mechanical refrigerating and dissipating means mounted on said refrigerator operatively connected to said refrigerator including means for circulating cooling water within said cooling chamber for continuously cooling the interior of said refrigerator and removing body heat from the milk during the milking operation and maintaining a predetermined temperature in said refrigerator, said conduit means further including conduits having open ends extending into said covers.*

GEORGE R. DUNCAN.

REFERENCES CITED

The following references are of record in the file of this patent or the original patent:

UNITED STATES PATENTS

| Number | Name | Date |
|---|---|---|
| 594,860 | Cushman | Dec. 7, 1897 |
| 719,443 | Devore | Feb. 3, 1903 |
| 812,842 | Good | Feb. 20, 1906 |
| 1,825,645 | Martin, Jr. | Sept. 29, 1931 |
| 2,006,393 | Hapgood | July 2, 1935 |
| 2,037,467 | Hapgood | Apr. 14, 1936 |
| 2,425,519 | Duncan | Aug. 12, 1947 |
| 2,509,214 | Cordis | May 30, 1950 |
| 2,603,396 | Redin | July 15, 1952 |

FOREIGN PATENTS

| Number | Country | Date |
|---|---|---|
| 4,461 | Great Britain | Oct. 8, 1894 |
| 421,112 | Great Britain | 1934 |
| 109,993 | Australia | Mar. 14, 1940 |

OTHER REFERENCES

VDI. Zeitschrift 20 Jahrgang, Heft 3, March 1939.

VDI. Zeitschrift Bd. 84 Nr. 29, July 20, 1940.